United States Patent
Liao et al.

(10) Patent No.: US 9,445,409 B2
(45) Date of Patent: Sep. 13, 2016

(54) METHOD FOR SEARCH SPACE CONFIGURATION OF ENHANCED PHYSICAL DOWNLINK CONTROL CHANNEL

(71) Applicant: MEDIATEK, INC., Hsin-Chu (TW)

(72) Inventors: Pei-Kai Liao, Nantou County (TW); Xiangyang Zhuang, Lake Zurich, IL (US)

(73) Assignee: MEDIATEK, INC., Hsin-Chu (TW)

(*) Notice: Subject to any disclaimer, the term of this patent is extended or adjusted under 35 U.S.C. 154(b) by 133 days.

(21) Appl. No.: 13/847,619

(22) Filed: Mar. 20, 2013

(65) Prior Publication Data
US 2013/0250880 A1    Sep. 26, 2013

Related U.S. Application Data

(60) Provisional application No. 61/613,759, filed on Mar. 21, 2012.

(51) Int. Cl.
*H04W 72/04* (2009.01)
*H04W 48/12* (2009.01)
*H04L 5/00* (2006.01)

(52) U.S. Cl.
CPC .......... *H04W 72/042* (2013.01); *H04L 5/0053* (2013.01); *H04L 5/0092* (2013.01); *H04L 5/0007* (2013.01); *H04W 48/12* (2013.01)

(58) Field of Classification Search
CPC .................................................. H04W 72/042
USPC ........... 370/329, 338, 341, 348; 455/68, 507
See application file for complete search history.

(56) References Cited

U.S. PATENT DOCUMENTS

| 8,537,862 B2* | 9/2013 | Blankenship ......... H04L 5/0053 370/252 |
| 2011/0044391 A1 | 2/2011 | Ji et al. ........................ 375/260 |

(Continued)

FOREIGN PATENT DOCUMENTS

| CN | 102111880 A | 12/2009 |
| CN | 102395206 A | 11/2011 |

(Continued)

OTHER PUBLICATIONS

International Search Report and Written Opinion of International Search Authority for PCT/CN2013/072976 dated Jun. 27, 2013 (12 pages).

(Continued)

*Primary Examiner* — Brian D Nguyen
*Assistant Examiner* — Toan Nguyen
(74) *Attorney, Agent, or Firm* — Imperium Patent Works; Zheng Jin; Helen Mao

(57) ABSTRACT

A method to allocate physical radio resources for both distributed and localized transmission schemes of ePDCCH and configure common and UE-specific search space for UE is provided. In one embodiment, a UE receives a first high-layer information to determine a first set of PRBs. The UE determines a first set of candidate ePDCCHs within the first set of PRBs, wherein one or more candidate ePDCCHs potentially carries DCI intended for the UE. The UE then decodes the first set of candidate ePDCCHs to obtain the DCI intended for the UE. Similar steps are performed for a second set of candidate ePDCCHs potentially carrying DCI intended for the UE. The allocated radio resources of the candidate ePDCCHs may be distributed or localized and constitute either common or UE-specific search space. Blind decoding complexity is reduced.

12 Claims, 7 Drawing Sheets

(56) References Cited

U.S. PATENT DOCUMENTS

| | | | |
|---|---|---|---|
| 2011/0076962 A1* | 3/2011 | Chen et al. | 455/68 |
| 2011/0077038 A1* | 3/2011 | Montojo et al. | 455/507 |
| 2011/0249633 A1* | 10/2011 | Hong et al. | 370/329 |
| 2011/0268062 A1 | 11/2011 | Ji et al. | 370/329 |
| 2011/0274031 A1* | 11/2011 | Gaal et al. | 370/315 |
| 2011/0310829 A1 | 12/2011 | Ji et al. | 370/329 |
| 2012/0039283 A1 | 2/2012 | Chen et al. | 370/329 |
| 2012/0106465 A1 | 5/2012 | Haghighat et al. | 370/329 |
| 2013/0039284 A1 | 2/2013 | Marinier et al. | 370/329 |
| 2013/0044693 A1* | 2/2013 | Lindh et al. | 370/329 |
| 2013/0100901 A1 | 4/2013 | Shan et al. | 370/329 |
| 2013/0114521 A1* | 5/2013 | Frenne et al. | 370/329 |
| 2013/0194931 A1 | 8/2013 | Lee et al. | 370/241 |
| 2013/0242904 A1 | 9/2013 | Sartori et al. | 370/329 |
| 2013/0250880 A1 | 9/2013 | Liao et al. | 370/329 |
| 2013/0301608 A1 | 11/2013 | Frenne et al. | 370/331 |
| 2014/0126487 A1 | 5/2014 | Chen et al. | 370/329 |
| 2014/0286297 A1 | 9/2014 | Zhao et al. | 370/329 |

FOREIGN PATENT DOCUMENTS

| | | |
|---|---|---|
| CN | 102395206 | 3/2012 |
| EP | 2811799 A1 | 1/2012 |
| EP | 2713658 | 4/2014 |
| EP | 2779768 | 9/2014 |
| JP | 2013157822 A | 1/2012 |
| WO | WO2011037439 | 3/2011 |
| WO | WO2011126212 | 10/2011 |
| WO | WO2011136523 A2 | 11/2011 |

OTHER PUBLICATIONS

USPTO, Office Action for related U.S. Appl. No. 13/927,113 dated Apr. 14, 2015 (23 pages).
USPTO, Office Action for related U.S. Appl. No. 13/889,554 dated Feb. 19, 2015 (17 pages).
International Search Report and Written Opinion of International Search Authority for PCT/CN2013/072712 dated Jun. 20, 2013 (12 pages).
R1-120453 3GPP TSG RAN WG1 Meeting #68; LG Electronics; Discussion on Multiplexing of DCI Messages; Dresden, Germany, Feb. 6-10, 2012 (4 pages).
R1-120332 3GPP TSG RAN WG1 Meeting #68; Research in Motion, UK Limited; Further Discussion on Reference Signals for E-PDCCH; Dresden, Germany, Feb. 6-10, 2012 (5 pages).
R1-114081 3GPP TSG RAN WG1 Meeting #67; NTT DOCOMO; Mapping Design for E-PDCCH in Rel-11; San Francisco, USA, Nov. 14-18, 2011 (5 pages).
R1-120330 3GPP TSG WG1 Meeting #68; Research in Motion, UK Limited; Search Space Design for E-PDCCH; Dresden, Germany, Feb. 6-10, 2012 (6 pages).
International Search Report and Written Opinion of International Search Authority for PCT/CN2013/075387 dated Aug. 15, 2013 (10 pages).
USPTO, Office Action for related U.S. Appl. No. 13/889,554 dated Jun. 3, 2015 (22 pages).
EPO, Search Report for the EP patent application 13761407.9 dated Jun. 25, 2015 (8 pages).
R1-112517 3GPP TSG-RAN1#66 meeting; Samsung; Discussion on ePDCCH Design Issue; Athens, Greece dated Aug. 22-26, 2011 (4 pages).
R1-120237 3GPP TSG RAN WG1 Meeting #68; Panasonic; Multiplexing of ePDCCHs and ePDCCH RE Mapping; Dresden, Germany dated Feb. 6-10, 2012 (4 pages).
R1-120383 3GPP TSG-RAN WG1 Meeting #68; Renesas Mobile Europe Ltd.; On ePDCCH Search Spaces; Dresden, Germany dated Feb. 6-10, 2012 (3 pages).
R1-120454 3GPP TSG RAN WG1 Meeting #68; LG Electronics; Concept of E-PDCCH CCE; Dresden, Germany dated Feb. 6-10, 2012 (3 pages).
R1-112219 3GPP TSG RAN WG1 Meeting #66; Intel Corporation; on Downlink Control Signaling Enhancement; Athens, Greece dated Aug. 22-26, 2011 (4 pages).
R1-104650 3GPP TSG RAN WG1 Meeting #62; LG Electronics; An Overview on R-PDCCH Design; Madrid, Spain dated Aug. 23-27, 2010 (7 pages).
JPO, Office Action for the JP patent application 2014-561279 dated Sep. 1, 2015 (10 pages).
EPO, Search Report for the EP patent application 13787661.1 dated Sep. 18, 2015 (5 pages).
3GPP TSG RAN WG1 #66bis R1-113372, LG-Ericsson, Consideration on E-PDCCH Multiplexing and Signaling, Zhuhai, China dated Oct. 14, 2011 (3 pages).
EPO, Search Report for the EP patent application 13764895.2 dated Oct. 6, 2015 (8 pages).
JPO, Office Action for the JP patent application 2015-500760 (no English translation) dated Nov. 24, 2015 (5 pages).
3GPP TSG RAN WG1 Meeting #68 R1-120111, CATT, Design of E-PDCCH Search Space, Dresden, Germany dated Feb. 6-10, 2012 (4 pages).
3GPP TSG WG1 Meeting #68 R1-120681, KDDI Corp., Configuration of Localized and Distributed Transmission for E-PDCCH, Dresden, Germany dated Feb. 6-10, 2012 (3 pages).
3GPP TSG RAN WG1 Meeting #68 R1-120140, InterDigital Communications et al., On Search Space Design for ePDCCH in Rel-11, Dresden, Germany dated Feb. 6-10, 2012 (3 pages).
3GPP TSG RAN WG1 Meeting #68bis R1-121454, LG Electronics, On the Necessity of Common Search Space on E-PDCCH, Jeju, Korea dated Mar. 26-30, 2012 (5 pages).
USPTO, Office Action for related U.S. Appl. No. 13/889,554 dated Feb. 17, 2016 (21 pages).

* cited by examiner

METHOD FOR SEARCH SPACE CONFIGURATION OF ENHANCED PHYSICAL DOWNLINK CONTROL CHANNEL

CROSS REFERENCE TO RELATED APPLICATIONS

This application claims priority under 35 U.S.C. §119 from U.S. Provisional Application No. 61/613,759, entitled "Method for Search Space Configuration of Enhanced Physical Downlink Control Channel," filed on Mar. 21, 2012, the subject matter of which is incorporated herein by reference.

TECHNICAL FIELD

The disclosed embodiments relate generally to physical downlink control channel (PDCCH), and, more particularly, to search space configuration of enhanced ePDCCH in OFDM/OFDMA systems.

BACKGROUND

LTE-Advanced (LTE-A) system improves spectrum efficiency by utilizing a diverse set of base stations deployed in a heterogeneous network topology. Using a mixture of macro, pico, femto and relay base stations, heterogeneous networks enable flexible and low-cost deployments and provide a uniform broadband user experience. In a heterogeneous network, smarter resource coordination among base stations, better base station selection strategies and more advance techniques for efficient interference management can provide substantial gains in throughput and user experience as compared to a conventional homogeneous network. For example, coordinated multiple points (CoMP), also known as multi-BS/site MIMO, is used to enhance the performance of cell-edge UEs in LTE-Advanced systems.

In 3GPP RAN1#65, the issue of downlink control capacity was first discussed for CoMP scenario 4, where both macrocell base station and remote radio heads (RRH) inside the macrocell coverage share the same physical cell ID. In 3GPP RAN1#66, it was agreed as a working assumption to have a new physical control channel inside the region of legacy physical downlink shared channel (PDSCH). The main benefits to have this new physical control channel are for the better support of HetNet, CoMP, and MU-MIMO. In 3GPP RAN1#68, it was agreed that an enhanced physical downlink control channel (ePDCCH) spans both first and second slots in the region of legacy PDSCH.

To exploit both diversity and beamforming/scheduling gain in ePDCCH, both distributed and localized transmission schemes are supported. However, supporting both distributed and localized transmission in both common and UE-specific search spaces for each UE may result in excessive control signaling and increased number of blind decoding. Furthermore, with existing search space design for legacy PDCCH, UE may not be able to enjoy the beamforming and/or scheduling gain in a specific frequency sub-band due to the predefined mapping rule from the physical resource to search space. To achieve all these goals, a solution to aggregate the assigned physical radio resources for both distributed and localized transmission schemes of ePDCCH and configure common and UE-specific search space for each UE is sought.

SUMMARY

A method to aggregate the assigned physical radio resources for both distributed and localized transmission schemes of ePDCCH and configure common and UE-specific search space for each UE is provided.

In one embodiment, a UE receives a first high-layer information to determine a first set of PRBs. The UE determines a first set of candidate ePDCCHs within the first set of PRBs, one or a plurality of the first set of candidate ePDCCHs potentially carries DCI intended for the UE. The UE then blindly decodes the first set of candidate ePDCCHs for DCI detection. Similar steps are performed for the UE to receive a second high-layer information to determine a second set of PRBs. The UE also determines a second set of candidate ePDCCHs within the second set of PRBs, one or a plurality of the second set of candidate ePDCCHs potentially carries DCI intended for the UE. The UE then blindly decodes the second set of candidate ePDCCHs for DCI detection.

The allocated radio resources of the candidate ePDCCHs may be distributed or localized. In addition, the ePDCCHs may constitute a common search space (CSS) or a UE-specific search space (UESS). As a result, the aggregated radio resources of candidate ePDCCHs for different UEs may be different. In other words, ePDCCH may be UE-specific and it is beneficial for blind decoding. With UE-specific ePDCCH, the size of search space for each UE can be reduced for smaller number of blind decoding candidates without affecting block rate of downlink schedulers and uplink grants so that UE can enjoy shorter processing time of DCI detection.

UESS or CSS can contain ePDCCHs of either distributed or localized type. Typically, CSS can contain only ePDCCHs of distributed type. This is because broadcast control information, such as system information, random access response and paging information, is intended for all UEs and more important. Therefore, the corresponding ePDCCHs may require better exploitation of frequency diversity to guarantee the robustness of UE reception. On the other hand, ePDCCHs of either distributed or localized type can be used for UESS depending on the transmission schemes for decoding the UESS. In one advantageous aspect, UESS can also be based on both distributed and localized ePDCCHs to allow dynamic switching between the diversity and precoding/beamforming transmission schemes.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
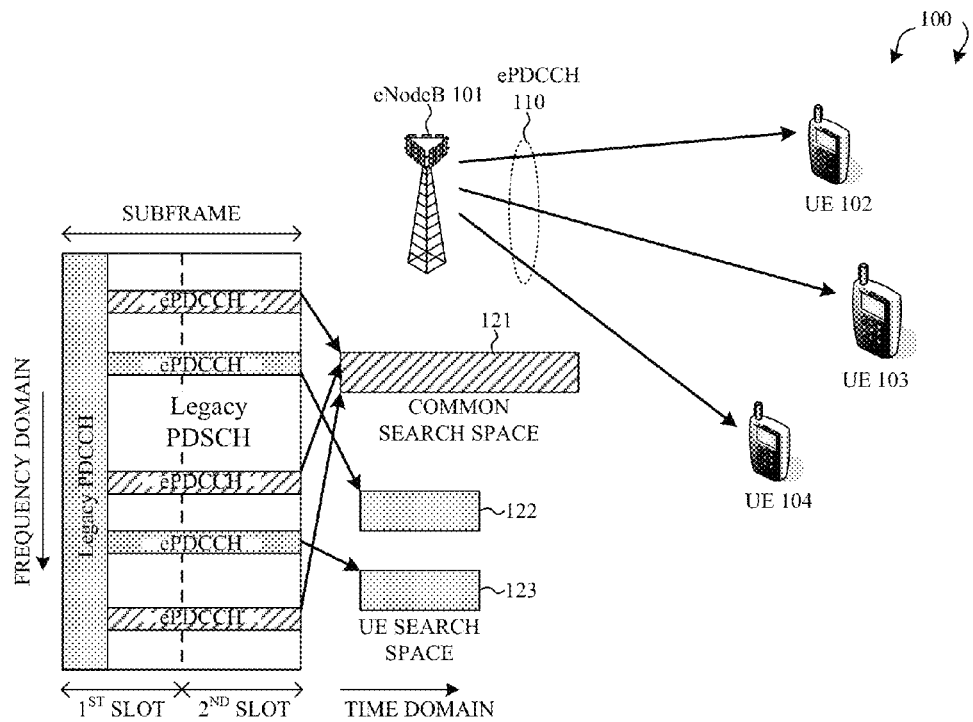
FIG. 1 illustrates a mobile communication network with search space configuration for ePDCCH in accordance with one novel aspect.

FIG. 1 illustrates a mobile communication network 100 with search space configuration for ePDCCH 110 in accordance with one novel aspect. Mobile communication network 100 is an OFDM/OFDMA system comprising a base station eNodeB 101 and a plurality of user equipment UE 102, UE 103, and UE 104. When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical downlink uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI).

In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots. In an evolved LTE system, an enhanced PDCCH (ePDCCH) spans both first and second slots in the region of legacy PDSCH.

In the example of FIG. 1, ePDCCH 110 is used for eNodeB 101 to send DCI to the UEs. In order to decode ePDCCH targeted specifically to a UE, the UE needs to find out where its ePDCCH is. In the so-called "blindly" decoding process, the UE must try a number of candidate ePDCCHs before knowing which ePDCCH is targeted for itself. The set of candidate ePDCCHs that a UE needs to try one by one is referred to as UE-specific search space (UESS). In addition to UE-specific search space, each UE must also decode possible broadcast control information that is sent via ePDCCH. Each UE must also search for broadcast control information on a number of candidate ePDCCHs, which is referred to as common search space (CSS).

In an evolved LTE system, the blind decoding of ePDCCH requires a UE to use UE-specific reference signal, also known as Dedicated RS (DRS), rather cell-specific reference signal (CRS). The benefit of using DRS is that eNodeB can use any transmission scheme to the target UE, rather than being confined to the same transmission scheme to all UEs. An ePDCCH may be of distributed type, where the radio resources employed by a distributed-type ePDCCH are distributed in the entire operation bandwidth. An ePDCCH may be of localized type, where the radio resources employed by a localized-type ePDCCH are within one or a contiguous set of PRBs.

In ePDCCH design, both search spaces CSS and UESS still need to be supported. Typically, CSS may use ePDCCHs of distributed type for maximal frequency diversity, while UESS may use ePDCCHs of localized type for beamforming gain. Any RE can be part of a distributed ePDCCH or a localized ePDCCH. The number of possible candidate ePDCCHs that can be formed from a set of REs may be very large. A UE that needs to search all of UESS and CSS can be prohibitively complex due to the large number of blind decoding required.

In one novel aspect, high-layer (e.g., RRC layer) signaling is utilized to configure the radio resources for ePDCCH for UESS and CSS. This is different from LTE Rel-8, 9, and 10 where UESS and CSS are both known a-prior. As illustrated in FIG. 1, eNodeB 101 configures ePDCCH 110 via high layer signaling. For example, a first RRC message is used to configure distributed-type ePDCCHs for common search space CSS 121, a second RRC message is used to configure localized-type ePDCCHs for UE-specific search space UESS 122, and a third RRC message is used to configure localized-type ePDCCHs for UE-specific search space UESS 123. The configured radio resources can be a subset of all radio resources potentially used for ePDCCHs, and different UEs can be configured with a different set of radio resources. For example, the first RRC message is sent to all UEs in the same cell served by eNodeB 101, the second RRC message is sent to a specific UE (e.g., UE 102), and the third RRC message is also sent to a specific UE (e.g., UE 103). Therefore, blind decoding complexity can be reduced.

Figure 2:
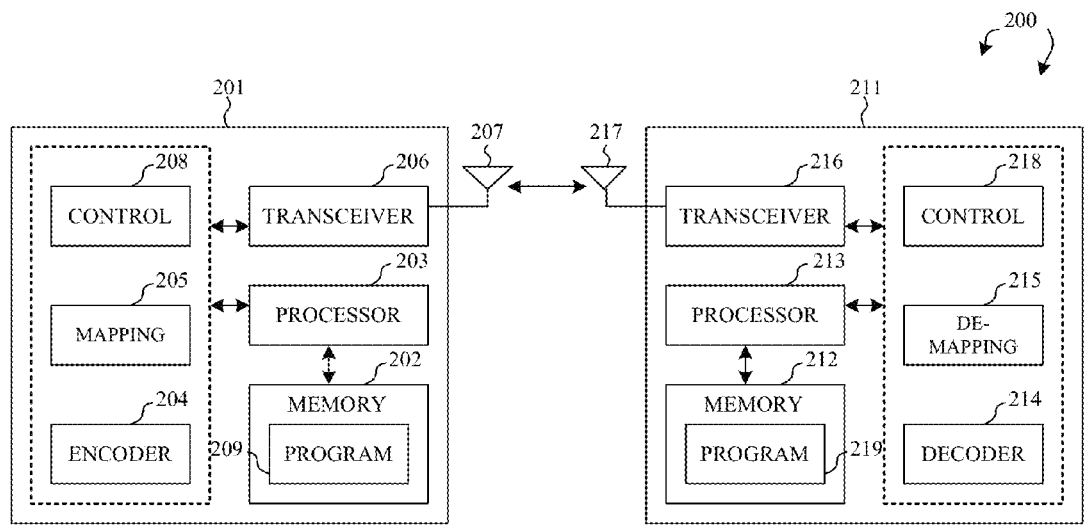
FIG. 2 is a simplified block diagram of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules to carry out some embodiments of the present invention. The different functional modules can be implemented by software, firmware, hardware, or any combination thereof. The function modules, when executed by the processors 203 and 213 (e.g., via executing program codes 209 and 219), for example, allow base station 201 to configure downlink control channel and transmit downlink control information to UE 211, and allow UE 211 to receive and decode the downlink control information accordingly. In one example, base station 201 configures a set of radio resource for ePDCCH transmission via control module 208 and maps the downlink control information to the configured REs via mapping module 205. The downlink control information carried in ePDCCH is then modulated and encoded via encoder 204 to be transmitted by transceiver 206 via antenna 207. UE 211 receives the ePDCCH configuration and the downlink control information by transceiver 216 via antenna 217. UE 211 determines the configured radio resource for ePDCCH transmission via control module 218 and de-maps the configured REs via de-mapping module 215. UE 211 then demodulates and decodes the downlink information from the collected REs via decoder 214.

The configured set of radio resources for ePDCCH can be in the form of PRBs. All the REs in the configured PRBs are mapped to a number of ePDCCH candidates. The physical structure of ePDCCH can be either two levels. First level is a physical unit of enhanced resource element groups (eREGs), where the group of REs is predefined for each eREG. Second level is a logical unit of enhanced control channel elements (eCCEs), where the group of eREGs is predefined or configurable by higher layer for each eCCE. The downlink control information is transmitted on a number of aggregated eCCEs according to the modulation and coding level required. For distributed ePDCCH transmission, the REs employed are always distributed across the configured PRBs so that the frequency diversity can be exploited sufficiently. For localized ePDCCH transmission, the REs employed are within one or a contiguous set of PRBs for better robustness in channel estimation by exploit pre-coding/beamforming gain.

UESS or CSS can contain ePDCCHs of either distributed or localized type. Typically, CSS can contain only ePDCCHs of distributed type. This is because broadcast control information, such as system information, random access response and paging information, is intended for all UEs and more important. Therefore, the corresponding ePDCCHs may require better exploitation of frequency diversity to guarantee the robustness of UE reception. On the other hand, ePDCCHs of either distributed or localized type can be used for UESS depending on the transmission schemes for decoding the UESS. UESS can also be based on both distributed and localized ePDCCHs to allow dynamic switching between the diversity and pre-coding/beamforming transmission schemes. UESS and CSS may be defined on a same or overlapping set of REs or PRBs. The partition of total REs in the PRBs between distributed and localized ePDCCH may be predefined or signaled via higher layers. The predefined rule can be either signaled from a set of rules or written in the standard specification.

Figure 3:
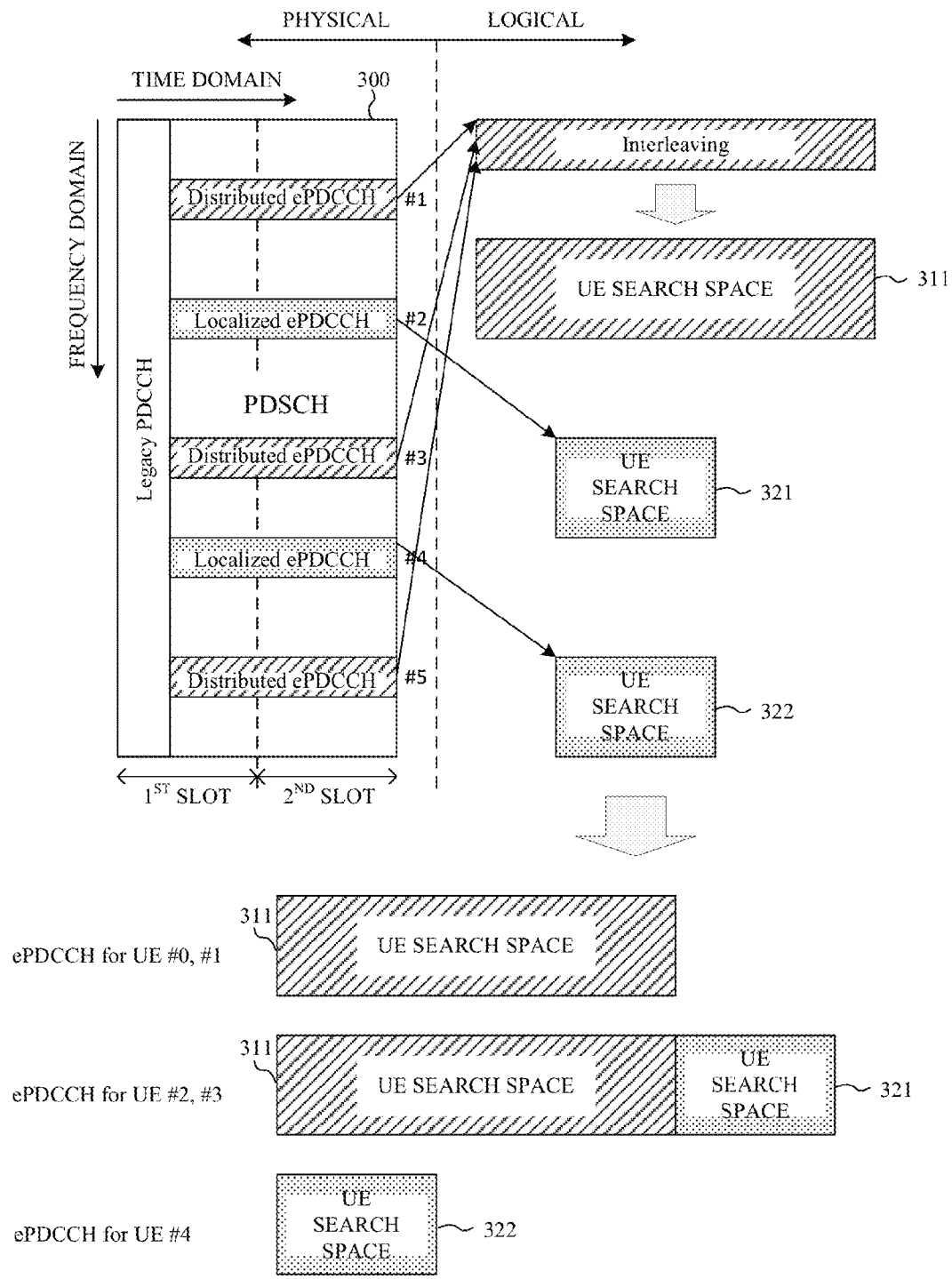
FIG. 3 illustrates a first example of search space configuration for ePDCCH.

FIG. 3 illustrates a first example of search space configuration for ePDCCH. As illustrated in FIG. 3, in physical space, a set of distributed-type candidate ePDCCHs are allocated within a first set of configured PRBs or PRB pairs (e.g., PRB pairs #1, #3, and #5), and several candidate localized-type ePDCCHs are allocated within a second set of configured PRBs or PRB pairs (e.g., PRB pairs #2 and #4) in a given subframe 300. In logical space, radio resources in PRB pairs #1, #3, and #5 allocated for distributed ePDCCHs are aggregated together and interleaved to exploit frequency diversity gain for robust DCI reception at the UE side. The aggregated and interleaved REs form a UE-specific search space UESS 311. On the other hand, radio resources in PRB pairs #2 and #4 allocated for localized ePDCCHs are not aggregated or interleaved. REs within PRB pair #2 form a UE-specific search space UESS 321, and REs within PRB pair #4 form a UE-specific search space UESS 322. The physical resources in the configured PRBs are mapped to logical eCCEs in both distributed and localized radio resources of ePDCCHs. For each UE, depending on which transmission scheme (diversity or beamforming) is applied, eCCEs for CSS and UESS are aggregated together, which are specifically assigned to one or a group of UE through higher layer configuration (e.g., RRC configuration).

In the example of FIG. 3, only UESS is configured for ePDCCH transmission. For example, UE#0 and UE#1 receive configuration information that indicates PRB pairs #1, #3 and #5 are allocated for distributed-type candidate ePDCCHs. UE#0 and UE#1 are then able to determine their own UESSs in UESS 311 based on the defined logical locations of the candidate ePDCCHs, which depend on the C-RNTI of a UE. Consequently, UE#0 and UE#1 can try to decode DCI in their own UESSs within UESS 311. For UE#2 and UE#3, they also receive configuration information that indicates PRB pairs #1, #3 and #5 are allocated for distributed candidate ePDCCHs. In addition, UE#2 and UE#3 also receive configuration information that indicates PRB pair #2 is allocated for localized candidate ePDCCH. UE#2 and UE#3 then determine their own UESSs in UESS 311 and UESS 321 based on the defined logical address of the candidate ePDCCHs, which depend on the C-RNTI of a UE. As a result, UE#2 and UE#3 can try to decode DCI in their own UESSs within UESS 311 and UESS 321. For UE #4, it receives configuration information that indicates PRB pair #4 is allocated for localized candidate ePDCCH. UE#4 thus determines its own UESS in UESS 322 based on the defined logical locations of the candidate ePDCCHs, which depend on the C-RNTI of a UE, and tries to decode DCI in its own UESS within UESS 322. It can be seen that the aggregated radio resources of candidate ePDCCHs for different UEs may be different. In other words, radio resources reserved for ePDCCH may be UE-specific and it is beneficial for blind decoding. With UE-specific ePDCCH, the size of search space for each UE can be reduced for smaller number of blind decoding candidates without affecting block rate of downlink schedulers and uplink grants so that UE can enjoy shorter processing time of DCI detection.

Figure 4:
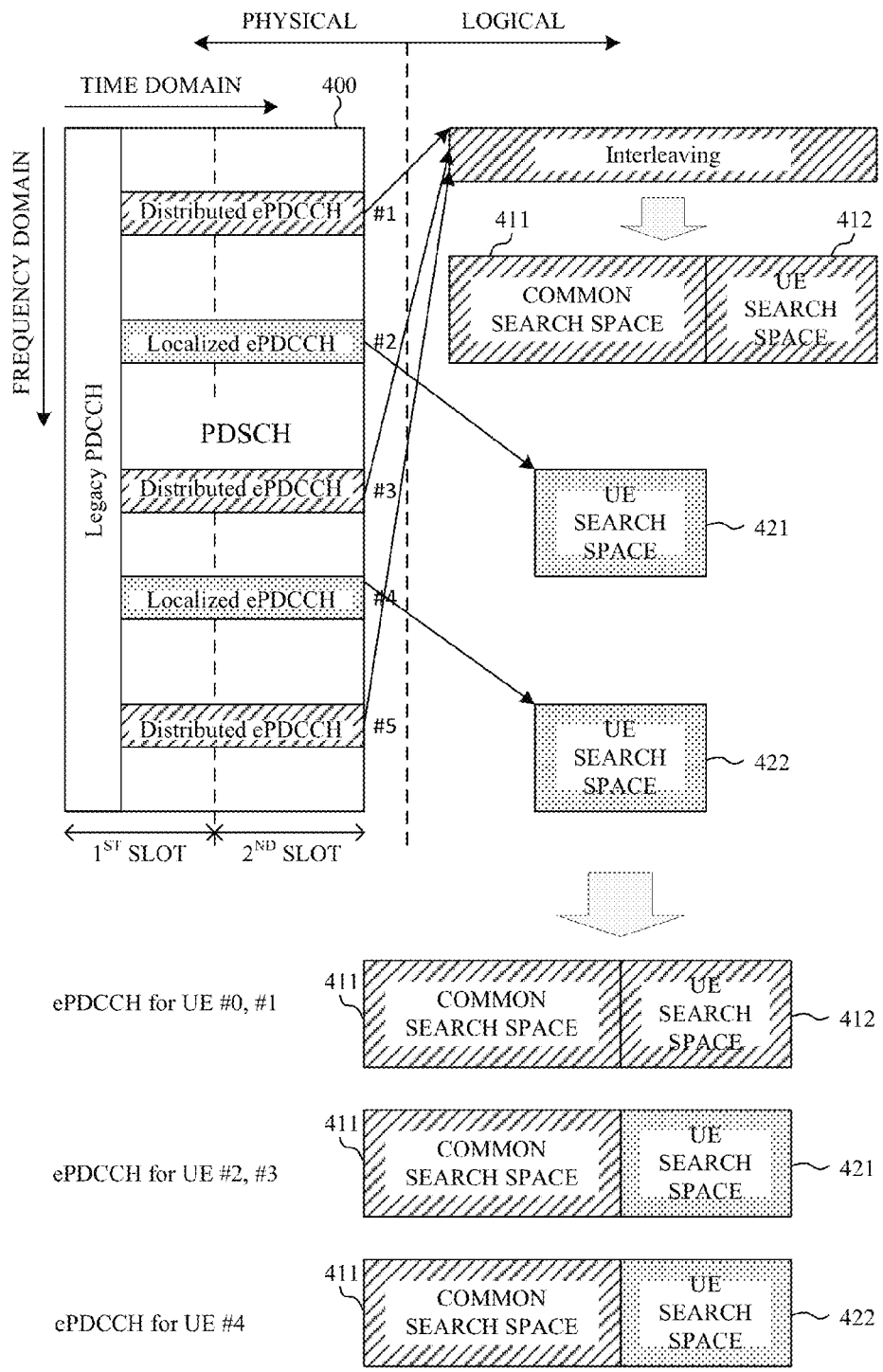
FIG. 4 illustrates a second example of search space configuration for ePDCCH.

FIG. 4 illustrates a second example of search space configuration for ePDCCH. As illustrated in FIG. 4, in physical space, a set of distributed-type candidate ePDCCHs are allocated within a first set of configured PRBs or PRB pairs (e.g., PRB pairs #1, #3, and #5), and several candidate localized-type ePDCCHs are allocated within a second set of configured PRBs or PRB pairs (e.g., PRB pairs #2 and #4) in a given subframe 400. In logical space, the PRB pairs (#1, #3, and #5) allocated for all distributed ePDCCHs are aggregated together and interleaving is carried out over all aggregated PRB pairs to exploit frequency diversity gain for robust DCI reception at the UE side. The aggregated and interleaved REs form both CSS 411 and UESS 412. On the other hand, the PRB pairs (#2 and #4) allocated for localized ePDCCHs are not aggregated or interleaved. REs within PRB pair #2 form a UE-specific search space UESS 421, and REs within PRB pair #4 form a UE-specific search space UESS 422. The physical resources in the configured PRBs are mapped to logical eCCEs in both distributed and localized radio resources of ePDCCHs. For each UE, depending on which transmission scheme (diversity or beamforming) is applied, eCCEs for CSS and UESS are aggregated together, which are specifically assigned to one or a group of UE through higher layer configuration (e.g., RRC configuration).

In the example of FIG. 4, both CSS and UESS are configured for ePDCCH transmission. The location of common search space and UE-specific search space may be defined in logical domain based on the logical addresses of corresponding eCCEs. For example, eCCE #0~#15 are defined for CSS, and eCCE #k~#k+4 are defined for UESS where k depends on C-RNTI of UE. For UE#0 and UE#1, they receive configuration information that indicates PRB pairs #1, #3 and #5 are allocated for distributed candidate ePDCCHs. UE#0 and UE#1 are then able to determine CSS 411 and UESS 412 based on the logical locations of the candidate ePDCCHs and their C-RNTIs. Consequently, UE#0 and UE#1 can try to decode DCI from CSS 411 and UESS 412. For UE#2 and UE#3, they also receive configuration information that indicates PRB pairs #1, #3 and #5 are allocated for distributed candidate ePDCCHs. UE#2 and UE#3 also determine CSS 411 based on the logical locations of the candidate ePDCCHs, and determine that UESS 412 is not allocated for them because UE 412 is not configured as UESS for UE#2 and UE#3. In addition, UE#2 and UE#3 receive configuration information that indicates PRB pair #2 is allocated for localized candidate ePDCCH. UE#2 and UE#3 then aggregate CSS 411 and UESS 421 based on the logical address of the candidate ePDCCHs. As a result, UE#2 and UE#3 can try to decode DCI from CSS 411 and UESS 421. Similarly, UE#4 can try to decode DCI from CS 411 and UESS 422 from RCC configuration.

Figure 5:
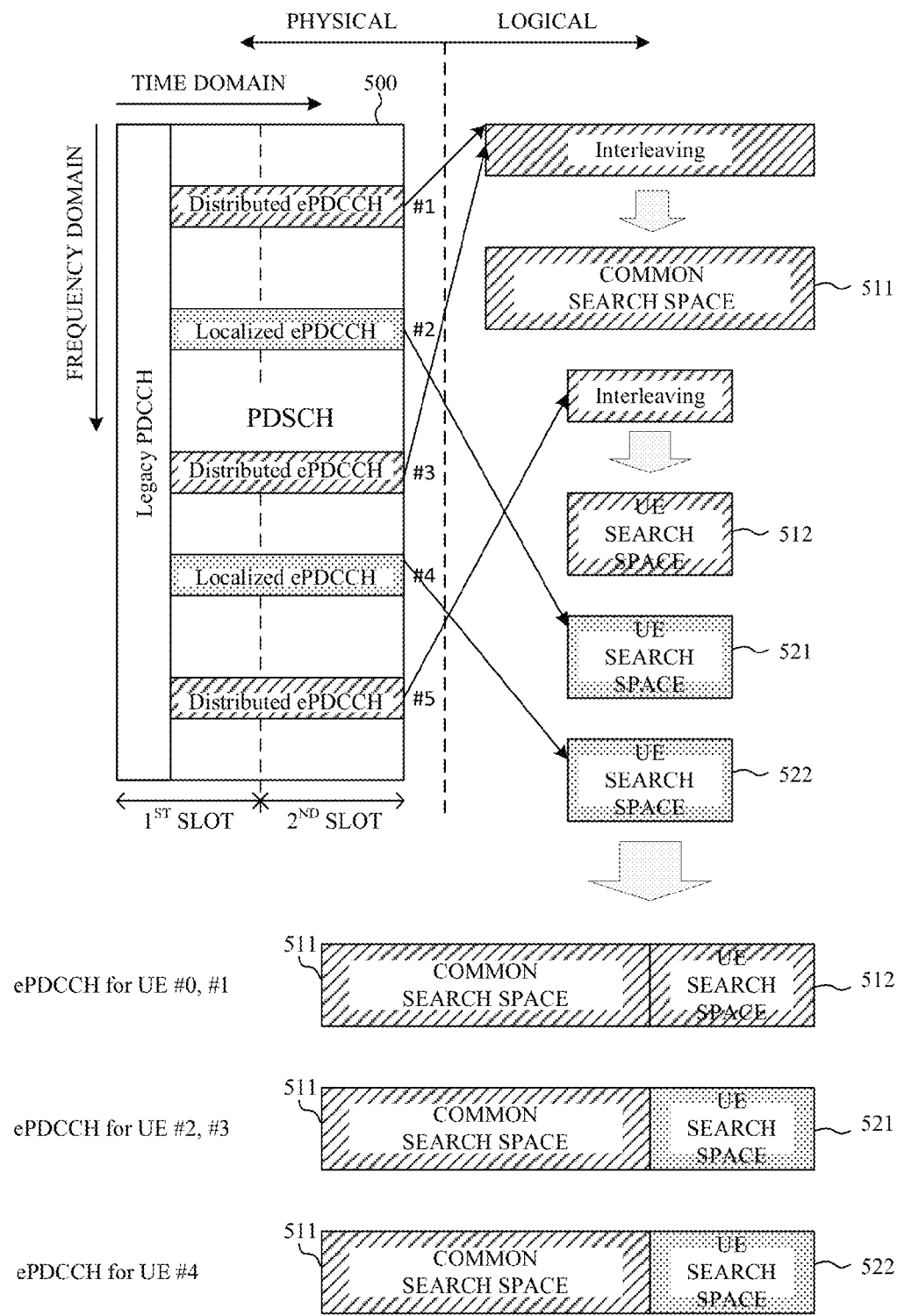
FIG. 5 illustrates a third example of search space configuration for ePDCCH.

FIG. 5 illustrates a third example of search space configuration for ePDCCH. FIG. 5 illustrates a different alternative as compared to FIG. 4. In the example of FIG. 5, PRB pairs for the distributed radio resources of ePDCCHs are further partitioned into two subset, PRB pairs #1 and #3 are allocated for common search space and PRB pair #5 is allocated for UE-specific search space. Inter-PRB-pair interleaving is carried out separately over these two subsets of PRB pairs. Interleaved radio resources over PRB pairs #1 and #3 form CSS 511, while interleaved radio resources over PRB pair #5 form UESS 512. While this approach provides less frequency diversity because of separately performed interleaving, it reduces signaling overhead because UESS 512 is independent from CSS 511 and thus can be configured to a specific UE (e.g., UE#0 and UE#1). As compared to FIG. 4, the PRB configuration of both CSS 411 and UESS 412 need to be broadcasted to all UEs in the same cell even though UESS 412 is configured only for UE#0 and UE#1.

Figure 6:
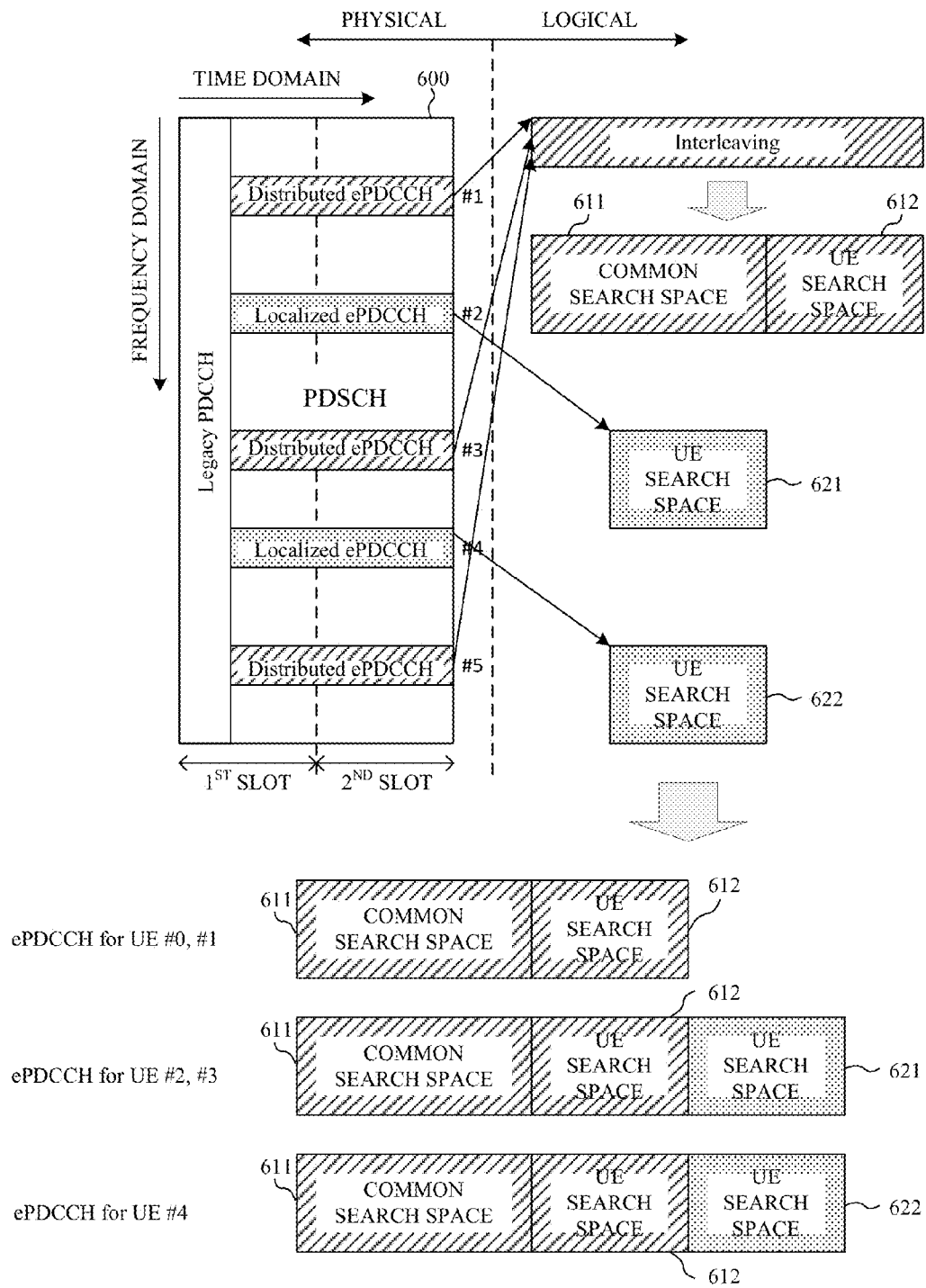
FIG. 6 illustrates a fourth example of search space configuration for ePDCCH.

FIG. 6 illustrates a fourth example of search space configuration for ePDCCH. The physical resources allocated for distributed ePDCCHs and localized ePDCCHs in FIG. 6 are very similar to FIG. 4. In addition, the PRB pairs (#1, #3, and #5) allocated for all distributed ePDCCHs are aggregated together, and inter-PRB-pair interleaving is carried out over all aggregated PRB pairs to exploit frequency diversity gain for robust DCI reception at the UE side. The distributed radio resources allocated within PRB pairs #1, #3 and #5 form both CSS 611 and UESS 612, the localized radio resources allocated within PRB pair #2 forms UESS 621, and the localized radio resources allocated within PRB pair #4 form UESS 622. After the mapping of physical resources to logical eCCEs, depending on which transmission scheme, eCCEs for both common and UE-specific search space in distributed radio resources of ePDCCH are assigned to each UE either directly or after being aggregated together with localized radio resources of ePDCCH.

In the example of FIG. 6, if a UE is configured to utilize diversity scheme only (or not allow beamforming scheme), then it has both common and UE-specific search space in distributed radio resources of ePDCCH. For example, UE#0 and UE#1 are configured by higher layer to decode DCI from CSS 611 and UESS 612. If a UE is configured to utilize beamforming scheme for ePDCCH reception, then it has common search space in distributed radio resources of ePDCCH, one part of UE-specific search space in distributed radio resources of ePDCCH, and another part of UE-specific search space in localized radio resources of ePDCCH. This way, DCIs in UE-specific search space for the UE can be allocated either in distributed or localized ePDCCH dynamically (e.g., subframe by subframe), depending on the channel state information (CSI) feedback from the UE or the base station's decision (e.g., use distributed ePDCCH for poor channel condition and use localized ePDCCH for good channel condition). For example, UE#2 and UE#3 are configured by higher layer to decode DCI from CSS 611 and UESS 612 or UESS 621. Similarly, UE#4 is configured by higher layer to decode DCI from CSS 611 and UESS 612 or UESS 622.

The split of UESS in distributed and localized radio resources of ePDCCH is predefined or configured by higher layer. The logical addresses of eCCEs in the localized radio resources of ePDCCH are ordered after eCCEs in the distributed radio resources of ePDCCH. As a result, an offset, which is either predefined or configured by higher layer, is added to the logical address of the UESS in the distributed radio resources of ePDCCH for the UE to find its UESS in the localized radio resources of ePDCCH. Note that the size of UESS for both diversity and beamforming schemes is the same so the number of blind decoding candidates is also the same when applying different transmission schemes. That is, the blind decoding of ePDCCH candidates for UE-specific DCI are split into two equal parts in the distributed and localized radio resources of ePDCCH.

Figure 7:
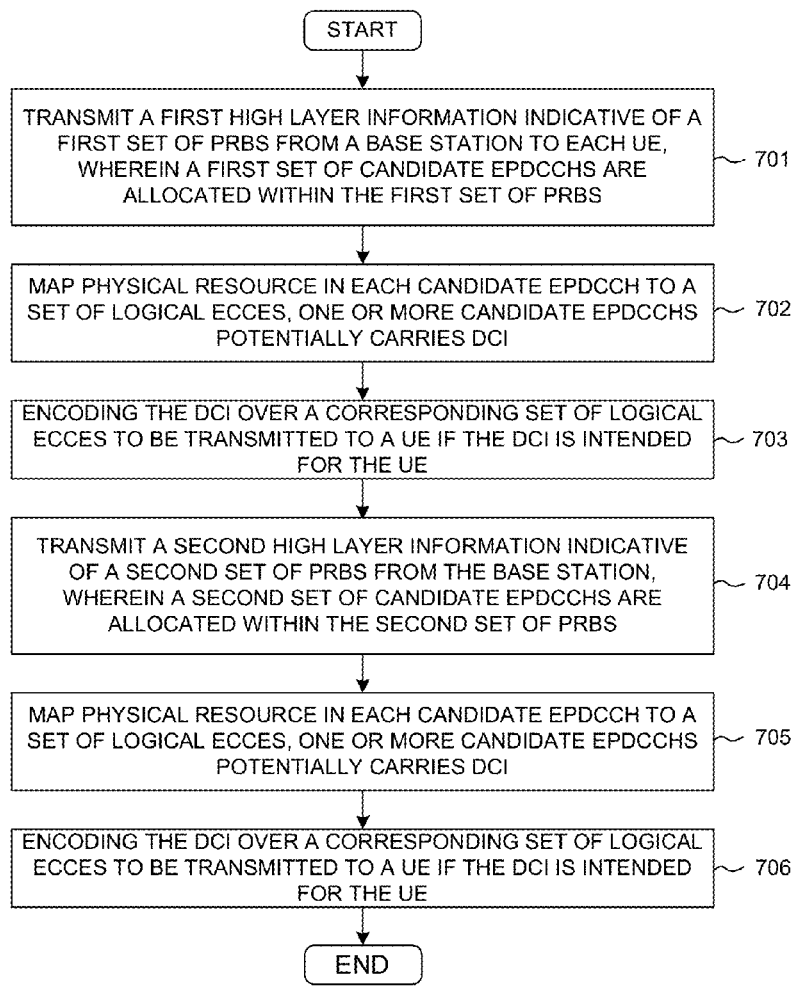
FIG. 7 is a flow chart of a method of configuring search space by a base station for ePDCCH in accordance with one novel aspect.

FIG. 7 is a flow chart of a method of configuring search space by a base station for ePDCCH in accordance with one novel aspect. In step 701, a base station transmits a first high-layer information indicative of a first set of PRBs to each UE, wherein a first set of candidate ePDCCHs are allocated within the first set of PRBs. In step 702, the base station maps physical resource in each candidate ePDCCH to a set of logical eCCEs, wherein one or a plurality of the first set of candidate ePDCCHs potentially carriers DCI. In step 703, the base station encodes the DCI over a corresponding set of eCCEs and transmits the DCI to a UE if the DCI is intended for the UE. The allocated radio resources of the candidate ePDCCHs may be distributed or localized. In addition, the ePDCCHs may constitute a common search space intended for all UEs in a cell or constitute a UE-specific search space intended for a specific UE only, based on the logical location of the corresponding eCCE.

Similarly, in step 704, the base station transmits a second high-layer information indicative of a second set of PRBs to each UE, wherein a second set of candidate ePDCCHs are allocated within the second set of PRBs. In step 705, the base station maps physical resource in each candidate ePDCCH to a set of logical eCCEs, wherein one or a plurality of the second set of candidate ePDCCHs potentially carriers DCI. In step 706, the base station encodes the DCI over a corresponding set of eCCEs and transmits the DCI to a UE if the DCI is intended for the UE. Similar to steps 701-703, the allocated radio resources of the candidate ePDCCHs may be distributed or localized. In addition, the ePDCCHs may constitute a common search space intended for all UEs in a cell or constitute a UE-specific search space intended for a specific UE only, based on the logical location of the corresponding eCCE.

Based on steps 701-706, the configured radio resources can be a subset of all radio resources potentially for ePDCCH, and different UEs can be configured with a different set of radio resources. Therefore, blind decoding complexity can be reduced potentially. Note that the order of performing steps 701-706 may be different. For example, the base station can transmit both first and second high-layer information to one or more UEs (steps 701 and 704), then map physical resource for both first and second set of ePDCCHs (steps 702 and 705), and finally encode and transmit DCI to a UE if the DCI is intended for the UE (steps 703 and 706).

Figure 8:
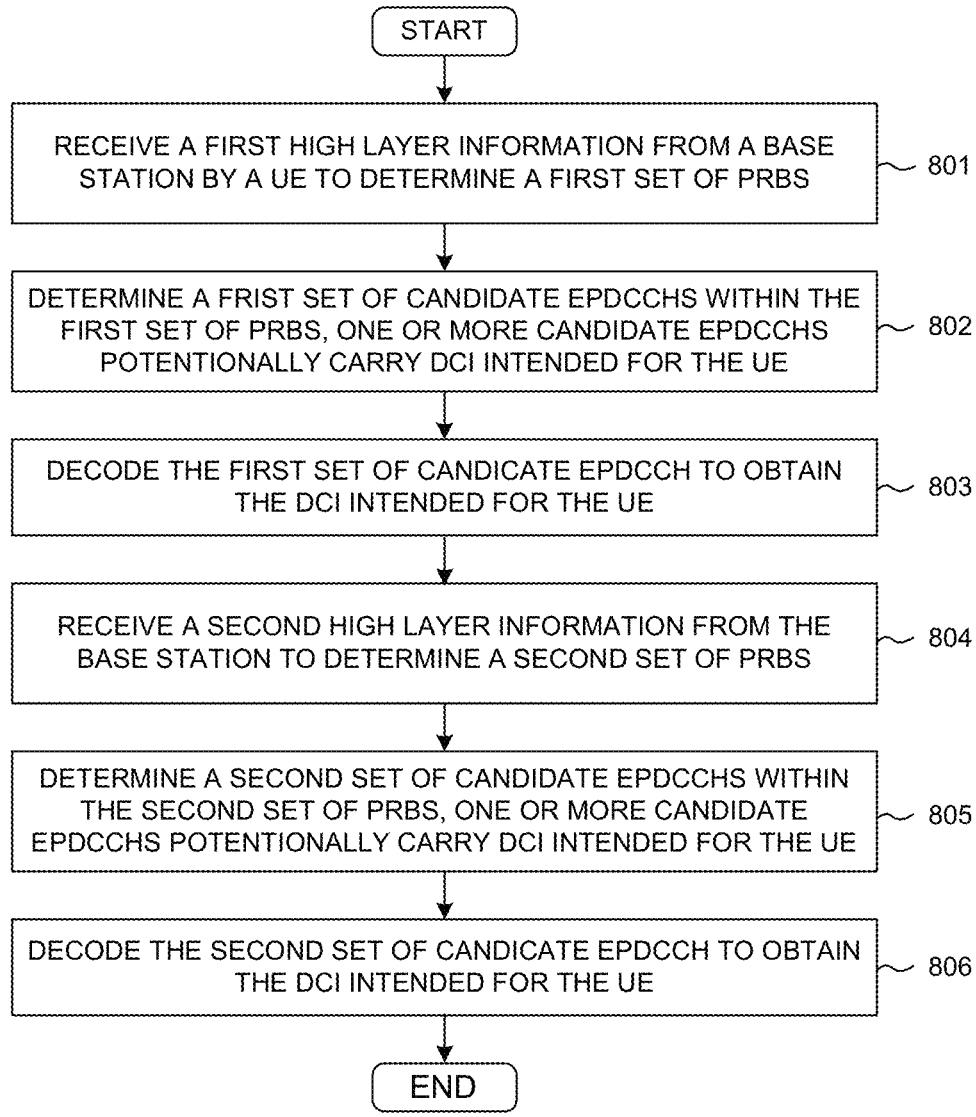
FIG. 8 is a flow chart of a method of decoding ePDCCH from configured search space by a user equipment in accordance with one novel aspect.

FIG. 8 is a flow chart of a method of decoding ePDCCH from configured search space by a user equipment in accordance with one novel aspect. In step 801, a UE receives a first high-layer information from a base station to determine a first set of PRBs. In step 802, the UE determines a first set of candidate ePDCCHs within the first set of PRBs, wherein one or more of the candidate ePDCCHs potentially carries DCI intended for the UE. In step 803, the UE decodes the first set of candidate ePDCCHs to obtain the DCI intended for the UE. The allocated radio resources of the candidate ePDCCHs may be distributed or localized. In addition, the ePDCCHs may constitute a common search space intended for all UEs in a cell or a UE-specific search space intended for a specific UE only, based on the logical location of the ePDCCH.

Similarly, in step 804, a UE receives a second high-layer information from a base station to determine a second set of PRBs. In step 805, the UE determines a second set of candidate ePDCCHs within the second set of PRBs, wherein one or more of the candidate ePDCCHs potentially carries DCI intended for the UE. In step 806, the UE decodes the second set of candidate ePDCCHs to obtain the DCI intended for the UE. The allocated radio resources of the candidate ePDCCHs may be distributed or localized. In addition, the ePDCCHs may constitute a common search space intended for all UEs in a cell or a UE-specific search space intended for a specific UE only, based on the logical location of the ePDCCH.

Based on steps 801-806, the configured radio resources can be a subset of all radio resources potentially for ePDCCH, and different UEs can be configured with a different set of radio resources. Therefore, blind decoding complexity can be reduced potentially. Note that the order of performing steps 801-806 may be different. For example, the UE can receive both first and second high-layer information from the base station (steps 801 and 804), then determine both first and second set of ePDCCHs (steps 802 and 805), and finally decode DCI intended for the UE (steps 803 and 806).

In one embodiment of the present invention, higher-layer (for example, RRC-layer) signaling is utilized to indicate the subframes where a UE should monitor CSS in the ePDCCH. The indication can be either UE-specific or cell-specific. One simple example to implement the higher-layer signaling is to have a bitmap where each bit corresponds to each subframe within a periodicity and the binary value of each bit in the bitmap is utilized to indicate whether a UE should monitor CSS in the ePDCCH in the corresponding subframe or not. With the indication, eNodeB may be able to allocate UESS only in ePDCCH and thus it can adjust or further reduce the control overhead due to the duplicate downlink control signaling in CSS in both legacy PDCCH and ePDCCH. Furthermore, with the indication, a UE can monitor CSS in PDCCH and UESS in ePDCCH in the subframes where the UE is configured not to monitor CSS in ePDCCH while a UE can monitor both CSS and UESS in ePDCCH in the subframes where the UE is configured to monitor CSS in ePDCCH.

In another embodiment of the present invention, higher-layer (for example, RRC-layer) signaling is utilized to indicate the subframes where a UE should monitor ePDCCH. The indication can be either UE-specific or cell-specific. One simple example to implement the higher-layer signaling is to have a bitmap where each bit corresponds to each subframe within a periodicity and the binary value of each bit in the bitmap is utilized to indicate whether a UE should monitor the ePDCCH in the corresponding subframe or not. With the indication, eNodeB may be able to allocate PDCCH only in all or part of subframes and thus it can provide finer granularity to dynamically adjust the overhead of downlink control information based on the needs of control channel capacity. Furthermore, with the indication, a UE can monitor both CSS and UESS in PDCCH in the subframes where the UE is configured not to monitor ePDCCH while a UE can monitor both CSS and UESS in ePDCCH in the subframes where the UE is configured to monitor ePDCCH.

Distributed and localized ePDCCHs fundamentally consists of REs in one or multiple PRBs. As an embodiment of indicating UESS or CSS, candidate ePDCCHs in UESS or CSS may be signaled as a set of REs based on which ePDCCHs of either type are formed. As a variation, if a PRB pair (two PRBs in the two slots occupying the same 12 frequency subcarriers) is partitioned into multiple resource element groups (REGs), the candidate ePDCCHs in UESS or CSS may be defined based on REGs. For example, if there are 4 PRB pairs reserved for ePDCCH and each PRB pair consist of 16 REGs, one can index them from REG1 to REG64. An ePDCCH of distributed type, with each distributed ePDCCH consisting of 4 REGs, one can get 16 distributed ePDCCH of size 4-REG, e.g., ePDCCH1={REG1, REG17, REG33, REG49}, all the way to ePDCCH16={REG16, REG32, REG48, REG64}. For distributed ePDCCH of size 8-REG, one can also get 8 ePDCCH, e.g., ePDCCH1={REG1, REG17, REG33, REG49, REG2, REG18, REG34, REG50}, all the way to ePDCCH8={REG15, REG31, REG47, REG63, REG16, REG32, REG48, REG64}. At the same time, for ePDCCH of localized type, with each distributed ePDCCH consisting of 4 REGs, one can also get 16 localized ePDCCH of size 4-REG, i.e., ePDCCH1'={REG1, REG2, REG3, REG4}, all the way to ePDCCH16'={REG61, REG62, REG63, REG64}. Instead of search for all candidate ePDCCH of size-4/8/16/32/64 REGs for both distributed and localized type, one can indicate UESS to be a subset. It can be either a subset of the ePDCCHs (of certain type, of certain size, of certain location, etc.), or a subset of REGs based on which a certain ePDCCH (say distributed) can be formed. For example, 8 REGs (e.g., REG1, 17, 33, 49, 2, 18, 34, 50) only for distributed ePDCCH in CSS, and thus only 3 candidate ePDCCHs (2 of size 4-REG and 1 of size-8REG) can be formed. Blind decoding complexity can be reduced significantly this way.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a first high-layer information from a base station by a user equipment (UE) to determine a first set of physical resource blocks (PRBs);
   (b) determining a first set of candidate enhanced physical downlink control channel (ePDCCHs) within the first set of PRBs, wherein one or a plurality of candidate ePDCCHs potentially carries downlink control information intended for the UE;

(c) decoding the first set of candidate ePDCCHs to obtain the downlink control information intended for the UE;

(d) receiving a second high-layer information from the base station by the UE to determine a second set of PRBs, wherein the second high-layer information is different from the first high-layer information;

(e) determining a second set of candidate ePDCCHs within the second set of PRBs, wherein one or a plurality of candidate ePDCCHs potentially carries the downlink control information intended for the UE; and (f) decoding the second set of candidate ePDCCHs to obtain the downlink control information intended for the UE.

2. The method of claim 1, wherein the second set of candidate ePDCCHs is of distributed type, wherein radio resources employed by distributed ePDCCHs spread across multiple non-contiguous PRBs.

3. The method of claim 1, wherein the second set of candidate ePDCCHs is of localized type, wherein radio resources employed by localized ePDCCHs are within one PRB or contiguous PRBs.

4. The method of claim 1, wherein the UE decodes the first set of ePDCCHs of distributed type for UE-specific search space in a first subframe applying a diversity transmission scheme, and wherein the UE decodes the second set of ePDCCHs of localized type for UE-specific search space in a second subframe applying a beamforming transmission scheme.

5. The method of claim 1, wherein the first set of candidate ePDCCHs is of distributed type, wherein radio resources employed by distributed ePDCCHs spread across multiple non-contiguous PRBs.

6. The method of claim 1, wherein the first set of candidate ePDCCHs is of localized type, wherein radio resources employed by localized ePDCCHs are within one PRB or contiguous PRBs.

7. A method, comprising:

(a) transmitting a first high-layer information indicative of a first set of physical resource blocks (PRBs) from a base station to each UE, wherein a first set of candidate enhanced physical downlink control channels (ePDCCHs) are allocated within the first set of PRBs;

(b) mapping physical resources in each candidate ePDCCHs to a set of logical enhanced control channel elements (eCCEs) for each UE, wherein one or a plurality of candidate ePDCCHs potentially carries downlink control information (DCI);

(c) encoding the downlink control information over a corresponding set of logical eCCEs to be transmitted to a UE if there is DCI intended for the UE;

(d) transmitting a second high-layer information indicative of a second set of PRBs from the base station to each UE, wherein a second set of ePDCCHs are allocated within the second set of PRBs, and wherein the second high-layer information is different from the first high-layer information;

(e) mapping physical resources in each candidate ePDCCHs to a set of eCCEs for each UE, wherein one or a plurality of candidate ePDCCHs potentially carries downlink control information (DCI); and (f) encoding the downlink control information over a corresponding set of logical eCCEs to be transmitted to a UE if there is DCI intended for the UE.

8. The method of claim 7, wherein the second set of candidate ePDCCHs is of distributed type, wherein radio resources employed by distributed ePDCCHs spread across multiple non-contiguous PRBs.

9. The method of claim 7, wherein the second set of candidate ePDCCHs is of localized type, wherein radio resources employed by localized ePDCCHs are within one PRB or contiguous PRBs.

10. The method of claim 7, wherein the base station transmits the first set of ePDCCHs of distributed type for UE-specific search space to a UE in a first subframe, and wherein the base station transmits the second set of ePDCCHs of localized type for UE-specific search space to the same UE in a second subframe.

11. The method of claim 7, wherein the first set of candidate ePDCCHs is of distributed type, wherein radio resources employed by distributed ePDCCHs spread across multiple non-contiguous PRBs.

12. The method of claim 7, wherein the first set of candidate ePDCCHs is of localized type, wherein radio resources employed by localized ePDCCHs are within one PRB or contiguous PRBs.

* * * * *